(12) United States Patent
Holland

(10) Patent No.: US 6,939,218 B1
(45) Date of Patent: Sep. 6, 2005

(54) METHOD AND APPARATUS OF REMOVING DEAD POULTRY FROM A POULTRY HOUSE

(76) Inventor: William C. Holland, 2547 Millers Ferry Rd. SW., Calhoun, GA (US) 30701

( * ) Notice: Subject to any disclaimer, the term of this patent is extended or adjusted under 35 U.S.C. 154(b) by 17 days.

(21) Appl. No.: 10/766,424

(22) Filed: Jan. 27, 2004

(51) Int. Cl.⁷ .............................................. A22C 21/00
(52) U.S. Cl. ...................... 452/198; 119/174
(58) Field of Search .............................. 119/174, 57.1, 119/57.6, 57.7, 447, 451, 843, 845; 452/198

(56) References Cited

U.S. PATENT DOCUMENTS

| | | | |
|---|---|---|---|
| 2,316,463 A * | 4/1943 | Skulina | 119/57.8 |
| 2,595,392 A * | 5/1952 | Lalancette | 119/442 |
| 2,843,086 A * | 7/1958 | Graham | 119/458 |
| 3,549,001 A * | 12/1970 | Harper et al. | 198/360 |
| 3,695,415 A * | 10/1972 | Bakker et al. | 198/371.2 |
| 3,941,091 A * | 3/1976 | Fleshman | 119/457 |
| 3,942,476 A * | 3/1976 | Napier | 119/437 |
| 4,430,960 A * | 2/1984 | Nagel et al. | 119/439 |
| 5,505,160 A * | 4/1996 | Pellerin | 119/57.1 |
| RE35,243 E * | 5/1996 | Tolson | 198/343.1 |

* cited by examiner

Primary Examiner—Thomas Price
(74) Attorney, Agent, or Firm—Eric R Katz

(57) ABSTRACT

A method and apparatus for removing carcasses of dead poultry randomly scattered throughout a poultry house are disclosed which reduce the amount of time and labor required to remove dead poultry during an entire growing session.

6 Claims, 5 Drawing Sheets

---

STEP 1
arranging items in the poultry house to form unobstructed lanes that extend substantially lengthwise through the poultry house

STEP 2
positioning at least a portion of a conveyor substantially parallel to the longitudinal centerline axis of the poultry house, the conveyor having a movable surface on which the carcass of poultry are placed

STEP 3
while traversing the width of the poultry house along each unobstructed lane of the poultry house, collecting the carcasses of dead poultry onto the floor of the poultry house at the conveyor

STEP 4
placing all the carcasses collected on the floor of the poultry house onto the movable surface of the conveyor

STEP 5
conveying the collected carcasses for removal out of the poultry house using the conveyor

STEP 1
arranging items in the poultry house to form unobstructed lanes that extend substantially lengthwise through the poultry house

STEP 2
positioning at least a portion of a conveyor substantially parallel to the longitudinal centerline axis of the poultry house, the conveyor having a movable surface on which the carcass of poultry are placed

STEP 3
while traversing the width of the poultry house along each unobstructed lane of the poultry house, collecting the carcasses of dead poultry onto the floor of the poultry house at the conveyor

STEP 4
placing all the carcasses collected on the floor of the poultry house onto the movable surface of the conveyor

STEP 5
conveying the collected carcasses for removal out of the poultry house using the conveyor

Figure 5

METHOD AND APPARATUS OF REMOVING DEAD POULTRY FROM A POULTRY HOUSE

BACKGROUND OF THE INVENTION

1. Field of the Invention

The present invention generally relates to a method and apparatus for removing dead poultry from a poultry house, and more particularly, to such a method and apparatus that reduces the amount of time and effort required to remove dead poultry from the poultry house.

2. Background of the Invention

The commercial poultry industry typically raises a large number of birds, for example, chickens, turkeys or the like, in huge building or poultry houses which are often times 400 in length, each house being capable of containing up to 30,000 birds. The birds are raised in the poultry house from the time they are hatchlings and spend their entire growing period within the enclosure of the building before being collected, crated and sold to market, once they reach the desired size and age.

Raising poultry such as chickens or turkeys is a labor intensive operation requiring constant care of the birds and their needs. Traditionally, chickens or other poultry have been fed by the farmer using a feed cart supported on an overhead rail to transport feed through the poultry house. The cart is manually rolled along the rail by the farmer to the various feed stations situated throughout the house while feed is shoveled from the cart into floor level, flat feed trays for young birds and into bowls for older poultry. The young chicks require flat feed trays because they are not tall enough to reach into the feed bowls. Automated feeding arrangements are also known wherein feed is conveyed via feed lines that extend from a central hopper outside the house to feed receptacles distributed throughout the poultry house.

In order to assure the mobility of the diminutive sized hatchlings and young chicks within the poultry house so that they can get adequate access to food and water, nothing is situated on the poultry house floor of the poultry house other than the feed bowls for the older birds. As a result, everything in the poultry house, such as the water lines, feed lines and the like, are suspended by wires from hangers which makes it difficult for the farmer to move freely throughout the poultry house or traverse the width of the poultry house. To minimize the obstructions caused by this situation, the suspend items are typically arranged parallel to the longitudinal axis of the poultry house to form unobstructed lanes so that the farmer must walk lengthwise through the house to get around.

Bird mortality is generally low during the early part of their life when they are relatively small, but increases as the birds get older and bigger. In order to maintain the general good health of the birds, the carcasses of the dead birds must be regularly and periodically removed from the poultry house. When the birds are young and small, the task of removing the dead birds is relatively easy because the mortality rate is fairly low and the size and weight of the birds is small.

During this period of the birds' growth cycle, a single bucket is sufficient to contain all the dead birds that are collected from the poultry house by the farmer during the periodic removal operations. The bird carcasses are then manually carried out of the poultry house in the single bucket and disposed of. This process typically requires the farmer to handle each bird carcass only once, i.e., when they are placed in the bucket.

However, as the birds get older, the mortality rate increases and as a result, there are more carcasses to be removed. In addition, the birds are bigger in size and weight. A single bucket is no longer sufficient to contain all the dead birds collected during a single, periodic removal session. As a result, the operation of removing the older birds is exceedingly difficult becoming one of the most labor intensive operations of poultry farming. Due to the increased size of the dead bird carcasses, the farmer collects the carcasses until the bucket is full and then piles the bucket of collected carcasses at strategic locations throughout the poultry house. Then each pile of dead birds is picked up and hand carried from the poultry house.

It is not uncommon for each pile of bird carcasses to comprise several full buckets of dead birds and to have numerous piles of carcasses scattered throughout the poultry house. As a result, the farmer is handling each of the bird carcasses at least three times; once upon placement into the bucket, then again when they are placed in the pile and a further time when they are picked up from the pile and removed from the poultry house.

In U.S. Pat. No. 4,223,638 to Sappington et al., which relates to a poultry feeder apparatus comprising a feed hopper suspended on an overhead rail by motor driven trolley wheels, Sappington et al. disclose the provision of a convenience receptacle mounted on the feed hopper for storing dead chicken or debris located by the farmer during feeding. As best seen in FIG. 1 of the '638 patent, the convenience receptacle comprises a bucket of a relatively small size inconveniently located on one side of the feed hopper. As a result, the bucket can be loaded from only one side of the hopper and due to it's diminutive size is not capable of containing all the dead poultry found during a single removal operation once the poultry grows older and bigger. This arrangement of conveying poultry carcasses therefore fails to solve the problem of reducing the number of times the farmer has to handle the poultry during a removal session and suffers from the same drawbacks of the manual method of removal.

It is also known to convey live poultry from fenced in collection areas within the poultry house to a truck using a motorized conveyor belt such as disclosed by U.S. Pat. No. 4,201,156 to Kahler. However, the Kahler invention is not adapted for nor does the patent disclose or suggest using this arrangement for removing dead poultry which are scattered randomly throughout the poultry house. Moreover, Kahler's device requires extensive and therefore labor intensive set-up within the poultry house before it can be used. In addition, the device must then be removed once the operation of transporting the live poultry out of the poultry house is complete in order to allow the farmer and/or poultry to move freely throughout the poultry house. As a result, Kahler's device's set-up and removal requirements are to labor intensive for practical use during the numerous poultry carcass removal operations that must be performed by the poultry farmer as the poultry grow to their harvest size.

SUMMARY OF THE INVENTION

Accordingly, it is an object of the present invention to provide a method of and apparatus for removing dead poultry from a poultry house that overcomes the deficiencies of the prior art.

Therefore, one object of the present invention is to provide a method and apparatus for removing dead poultry from a poultry house that reduces the amount of labor required for removing dead poultry carcasses.

Another object of the present invention is to provide a method and apparatus for removing dead poultry from a poultry house that permits removal of all dead poultry, regardless of size, during a single removal operation.

Yet another object of the present invention is to provide a method and apparatus for removing dead poultry from a poultry house that permits loading of the poultry carcasses for removal from any location within the poultry house.

Still another object of the present invention is to provide a method and apparatus for removing dead poultry from a poultry house that reduces the number of times that the farmer has to handle the poultry carcasses during each removal operation.

One advantageous feature of the present invention is that there is no need to remove the equipment, used in accordance with method to transport the poultry carcasses for removal out of the poultry house, into and/or out of the poultry house each time a poultry carcass removal operation is required.

Another advantageous feature of the present invention is that the equipment used to transport the poultry carcasses for removal out of the poultry house does not obstruct the floor area of the poultry house.

An advantageous feature of one embodiment of the method and apparatus of the present invention is that there are no special set-up, removal or storage requirements for the equipment used to remove the dead poultry and in some cases the invention can employ equipment already existing in the poultry house.

These and other objects, advantages and features of the present invention are achieved by a method of removing carcasses of dead poultry randomly scattered throughout a poultry house having a floor, a width and a longitudinal centerline axis, the method comprising, according to one embodiment thereof, the steps of: arranging items in the poultry house to form unobstructed lanes that extend substantially lengthwise through the poultry house; positioning at least a portion of the conveyor substantially parallel to the longitudinal centerline axis of the poultry house, the conveyor having a moveable surface on which the carcasses are placed; while traversing the width of the poultry house by walking along each unobstructed lane of the poultry house, throwing the carcasses of dead poultry found in each unobstructed lane to the floor of the poultry house at the conveyor; placing all the carcasses thrown to the floor of the poultry house onto the surface of the conveyor; and conveying the carcasses for removal out of the poultry house using the conveyor.

Further in accordance with the teachings of the present invention there is provided an apparatus for removing carcasses of dead poultry randomly scattered throughout a poultry house having a floor, a width, and a longitudinal centerline axis wherein items in the poultry house are arranged substantially parallel to the longitudinal centerline axis of the poultry house to form unobstructed lanes that extend lengthwise through the poultry house. The apparatus comprises, according the one embodiment thereof, a conveyor for conveying the carcasses of dead poultry for removal out of the house, the conveyor having a surface on which the carcasses are place; means for positioning at least a portion of the surface of the conveyor substantially parallel to the longitudinal centerline axis of the poultry house so that the entire conveyor is suspended off of the floor of the poultry house; and means for driving surface of the conveyor; wherein, while traversing the width of the poultry house by walking along each unobstructed lane of the poultry house, the carcasses of all the dead poultry found in each unobstructed lane are thrown to the floor of the poultry house at the conveyor. Once all the carcasses have been so collected, they are then placed on the surface of the conveyor and conveyed for removal out of the poultry house by driving the surface of the conveyor.

Still other objects and advantages of the present invention will become readily apparent to those skilled in the art from the following detailed description, wherein there are shown and described preferred embodiments of the invention simply by way of illustration of the best mode contemplated by the inventor for carrying out the invention. As will be realized, the invention is capable of other and different embodiments without departing from the invention. Accordingly, the drawings and descriptions are regarded as illustrative in nature and not as restrictive.

BRIEF DESCRIPTION OF THE DRAWINGS

FIG. 5 is a block diagram illustrating the steps of the method of the present invention.

DETAILED DESCRIPTION OF THE EMBODIMENTS OF THE INVENTION

Figure 1:
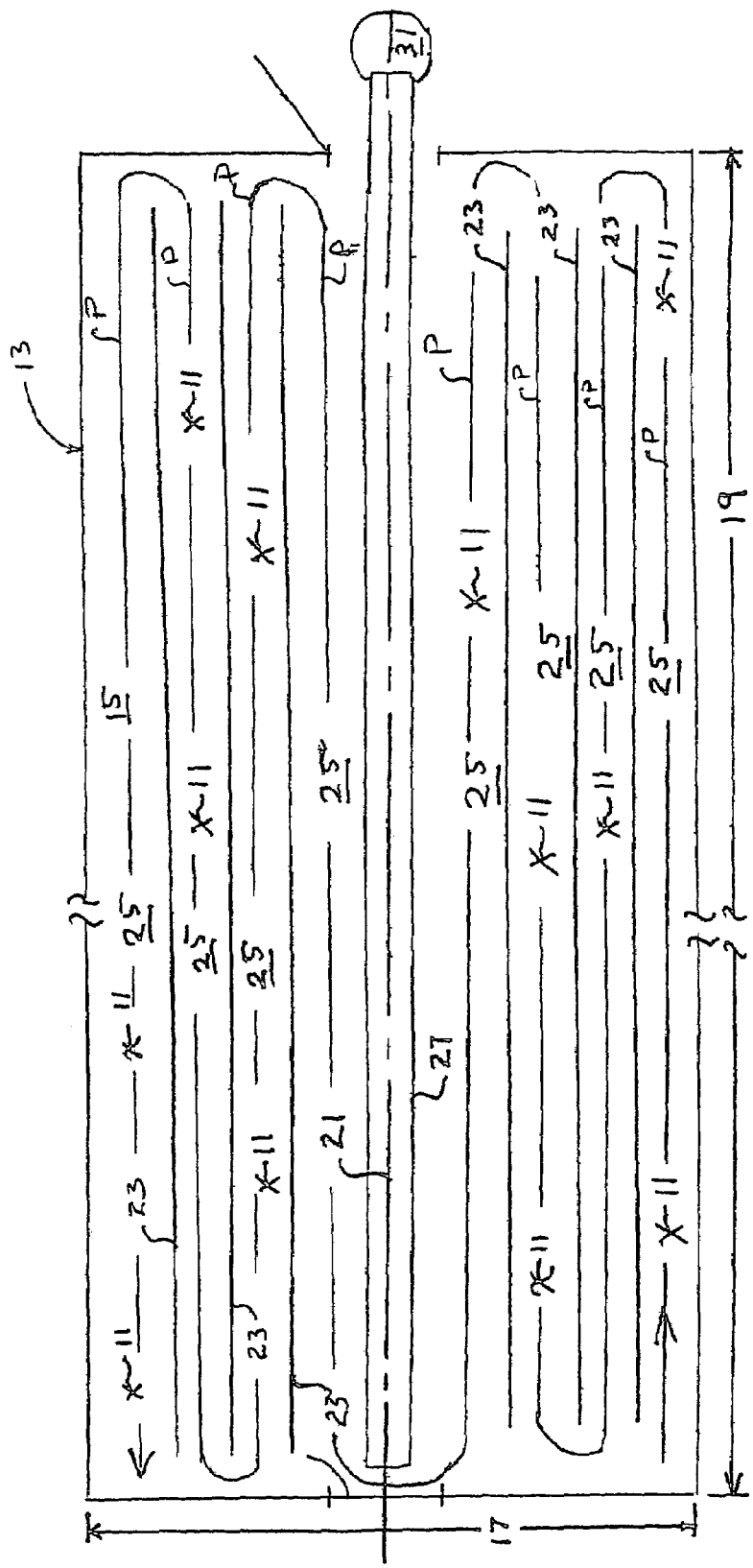
FIG. 1 illustrates the arrangement of a poultry house for performing the method of the present invention.

The present invention generally relates to a method of and apparatus for removing the carcasses of dead poultry from a poultry house. As best seen in FIG. 1, the carcasses 11 of dead poultry are randomly scattered throughout a poultry house 13 having a floor 15, a width 17, a length 19 and a longitudinal centerline axis 21. Items 23 items in the poultry house 13, such as feed trays, water lines and feed lines, are arranged to form unobstructed lanes 25 that extend lengthwise through the poultry house 13. Positioned substantially parallel to the longitudinal centerline axis 21 of the poultry house 13 is a conveyor 27 which is employed to convey the carcasses 11 for removal out of the poultry house 13.

Figure 4:
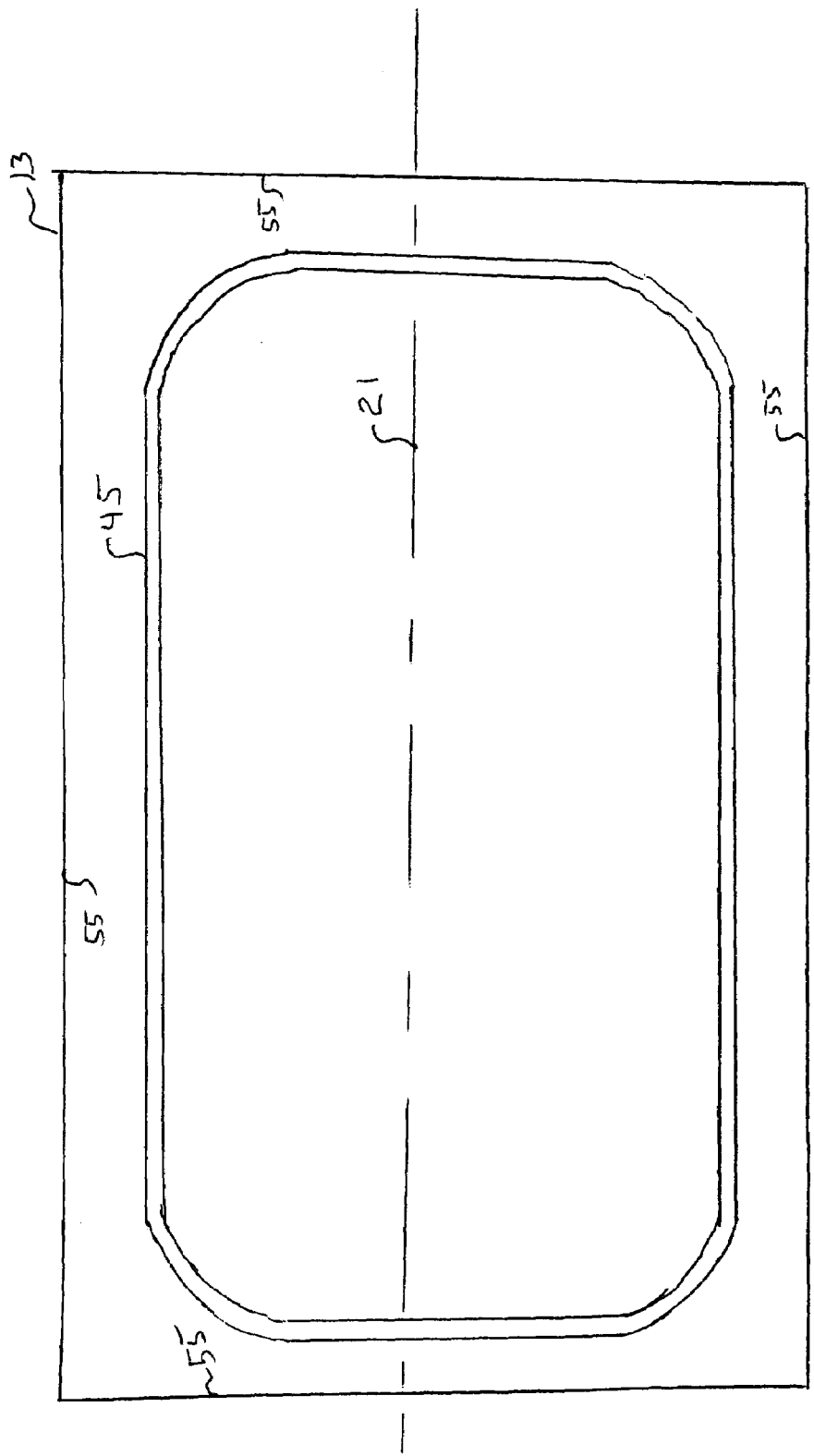
FIG. 4 illustrates a further arrangement of the apparatus shown in FIG. 3.

In accordance with one embodiment of the present invention, the conveyor is position substantially along the longitudinal centerline axis 21 of the poultry house 13 as shown in FIG. 1. According to a further embodiment of the present invention, the conveyor is positioned along, for example, a closed loop that extends adjacent to interior perimeter of the house 13. This latter arrangement, as seen in FIG. 4, is particularly useful in wider than normal poultry houses 13, for example, houses having a width of 60 feet or more.

In addition, as will be more fully discussed hereinafter, the conveyor 27 is not intended to be moved into or out of the poultry house 13 during each carcasses removal operation, but rather is installed only once within the poultry house 13 thereby reducing the amount of labor needed to remove dead poultry carcasses during a growing season using the method of the present invention. In addition, with particular reference to FIGS. 3 and 4, existing feed delivery arrangements can be adapted for use in accordance with present invention.

In accordance with the teachings of the present invention, during a traverse of the width 17 of the poultry house 13, along a circuitous path P along each unobstructed lane 25 of the poultry house 13, the carcasses 11 of dead poultry found in each unobstructed lane 25 of the poultry house 13 are collected by the farmer onto the floor 15 of the poultry house 13 at the conveyor 27. The farmer need only reach down and pick up each carcass 11 encountered while walking down an unobstructed lane 25 and throw or pitch the carcass 11 to the floor 15 at the conveyor 27. Once all the carcasses 11 have been collected on the floor 15 at the conveyor 27, the farmer walks down along the side of conveyor 27 and picks up the carcasses on the floor and places all the carcasses 11 collected on the floor 17 onto the conveyor. The collected carcasses 11 are then conveyed for removal out of the poultry house 13 using the conveyor 27. A container 21 can be provided for collecting for disposal all the carcasses 11 conveyed for removal out of the poultry house 13 by the conveyor 27.

The conveyor 27 is preferable suspended off of the floor 15 of the poultry house 13. As a result, the area under the conveyor 27 is unobstructed and during the collection process, it is possible for the farmer to collect the carcasses 11 on the floor at the conveyor 27 so that all the carcasses can be reached while walking the length 19 of the poultry house 13 beside the conveyor 27. Thus, according to the embodiment illustrated by FIG. 1, all the carcasses 11 collected on the floor 15 can be placed on the conveyor 27 during a single traverse of the length of the poultry along the longitudinal centerline of the poultry house.

Figure 2:
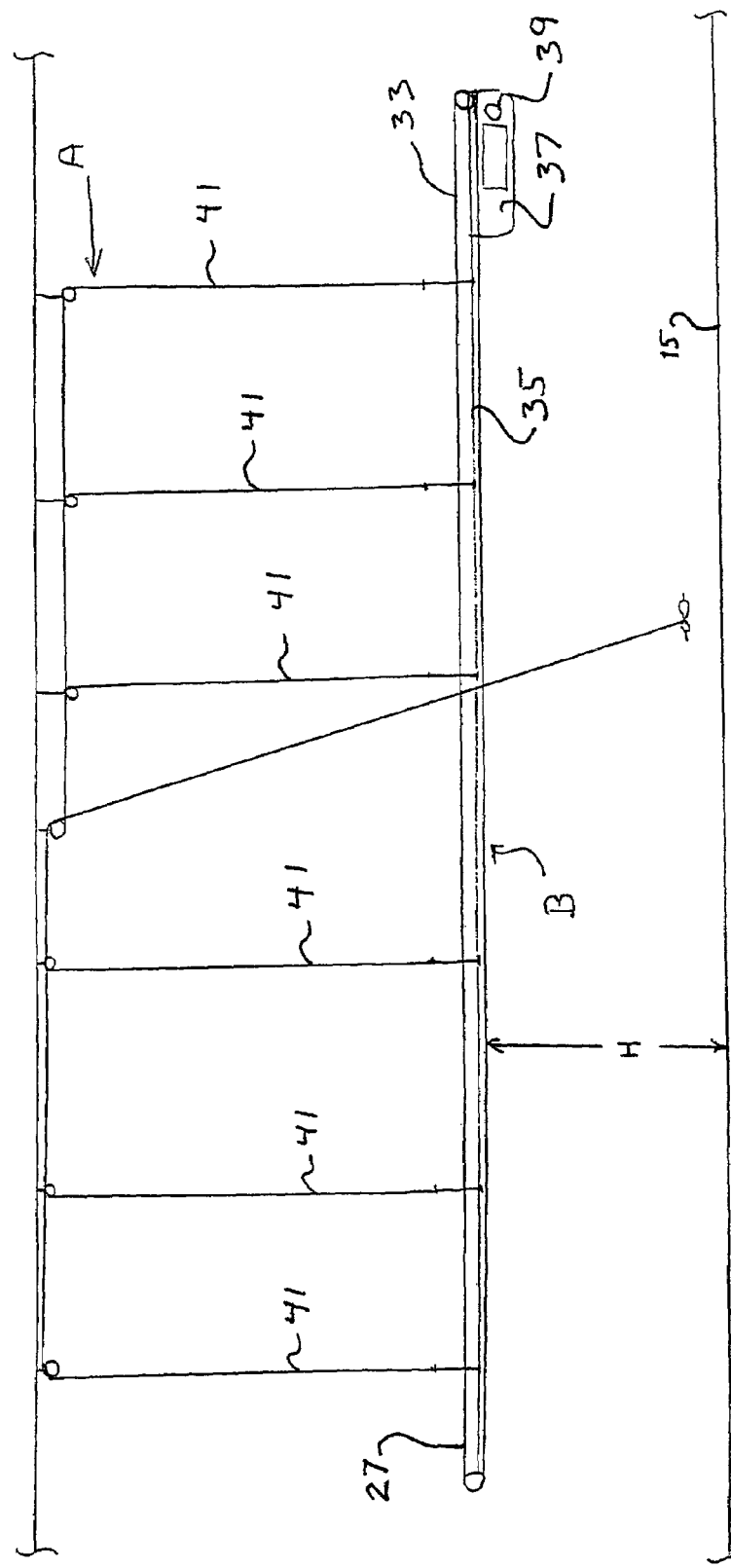
FIG. 2 illustrates one embodiment of the apparatus in accordance with the teachings of the present invention.

Referring to FIG. 2, the conveyor 27, according to one embodiment thereof, has a surface, for example, a motor driven endless belt 33 looped on and supported by a tray 35. The carcasses 11 are placed on the endless belt 33 and conveyed for removal out of the poultry house 13 by turning on the motor 37, for example, using on/off switch 39. In this embodiment, the tray 35 of the conveyor 27 is suspended by wires 41 that extend and retract to move the conveyor 27 between a stored position A adjacent a ceiling of the poultry house 13 and an operational position B adjacent to the floor 15 of the poultry house 13. Therefore, the conveyor 27 need only be install once and is stored out of the way when not in use by moving the conveyor 27 from the operational position B to the stored position A adjacent the ceiling after all the carcasses 11 are conveyed out of the poultry house 13.

This arrangement also permits easy loading of poultry carcasses 11 from the poultry house floor 15 onto the conveyor 27 since the height H of the conveyor 27 above the floor 15 of the poultry house 13 can be variably adjusted to a height H for easy loading of carcasses onto the conveyor 27. As a result, the amount of labor needed to use the method of the present invention as compared to prior methods is greatly reduced because labor intensive set-up and tear down of the conveyor 27 for each of the numerous poultry carcass collection sessions are eliminated.

Figure 3:
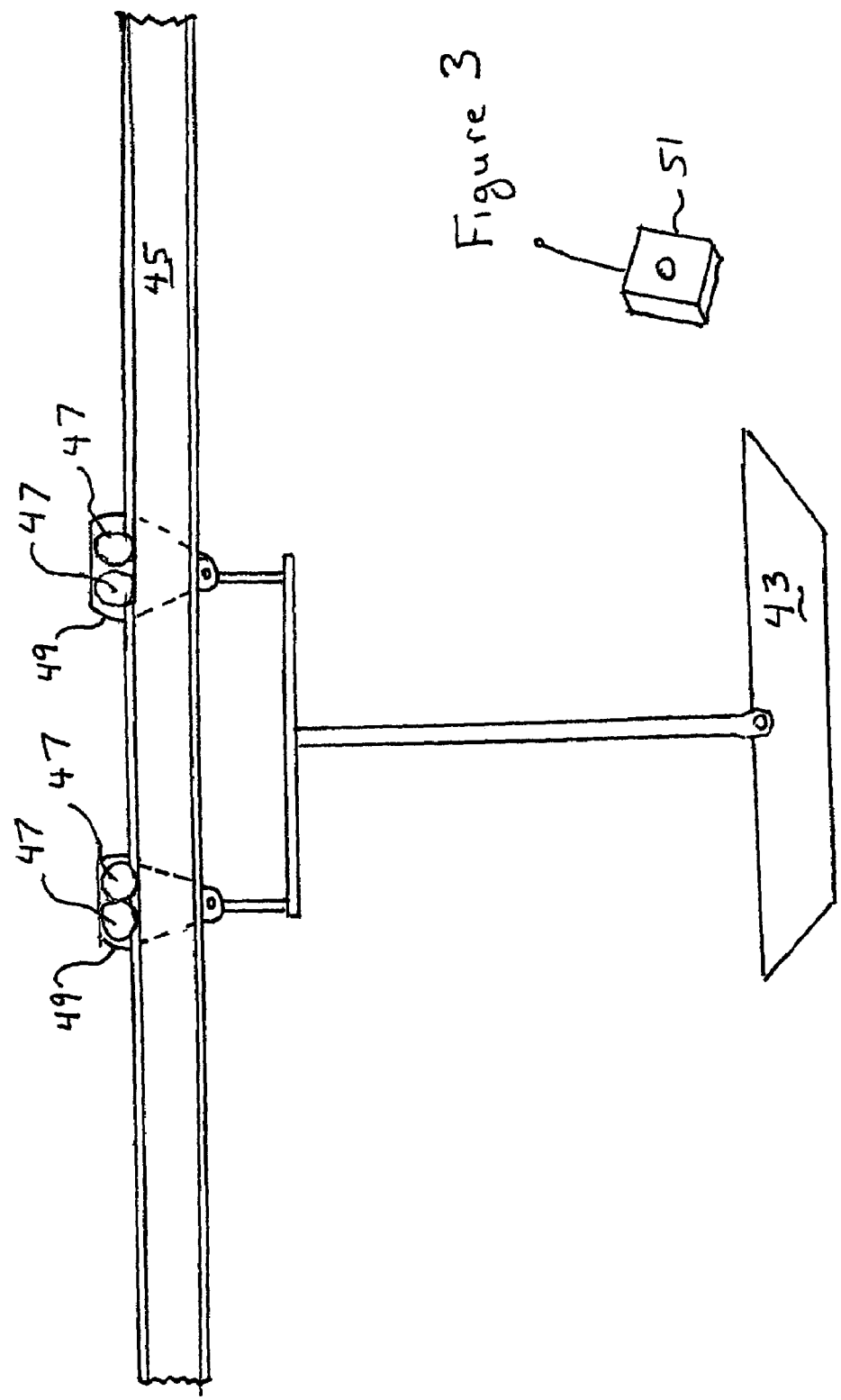
FIG. 3 illustrates another embodiment of the apparatus of the present invention.

Referring to FIG. 3, according to a further embodiment of the apparatus of the present invention, the conveyor 27 has a surface comprising a basket 43 suspended from an overhead rail 45 by wheels 47, the overhead rail 45 being position adjacent the ceiling of the poultry house 13 so as to extend parallel to the longitudinal axis 21 of the poultry house 13. In this arrangement, the overhead rail 45 is positioned substantially parallel to the longitudinal centerline 21 of the poultry house, for example, as shown in FIG. 1. As previously discussed, the carcasses 11 found in each unobstructed lane 25 of the poultry house 13 are thrown by the farmer onto the floor 15 of the poultry house 13 beneath or at the overhead rail 45 during a single traverse of the width 17 of the poultry house. The poultry carcasses 11 are then placed in the basket 43 suspended from the overhead rail 45 during a single traverse along the length 19 of the poultry house 13 while manually rolling the basket 43 along the rail 45 substantially from one end of the poultry house 13 to the other. The basket 43 is substantially open on all sides so that the carcasses 11 of dead poultry are placed into the basket 43 from any side of the basket 43 without restriction. In addition, the basket 43 is large enough to hold all the carcasses 11 of dead poultry collected during a single traverse of the width of the poultry house regardless of the size and age of the poultry.

According to yet another embodiment of the apparatus of the present invention, the surface, i.e., the basket 43 is suspended from the rail 45 by wheels 47 that are driven by a motor 49. As previously described above in regard to the method, carcasses 11 are placed in the basket 43 during a single traverse of the length 19 of the poultry house 13, however, with this arrangement the basket 43 is moved along the rail 45 substantially from one end of the poultry house 13 to the other under the control of the motor 49. The operation of the motor 49 is preferably controlled by a remote control, hand-held device 51 so that the position of the basket 43 along the longitudinal axis 21 of the poultry house 13 is controlled by the farmer using the remote control device 51.

Referring to FIG. 4, according to a further embodiment of the apparatus shown in FIG. 3, the overhead rail 45 of the conveyor is positions along a closed loop that extends adjacent to the interior perimeter 55 of the house 13. This is particularly useful in wider than normal poultry houses 13, for example, houses having a width of 60 feet or more. Applicant notes that a normal poultry house width is about 40 feet.

Referring to FIG. 5, a block diagram illustrates one embodiment of the method for removing carcass of dead poultry randomly scattered throughout a poultry house having a floor, a width, a length and a longitudinal centerline axis. In step one, items in the poultry house are arranged to form unobstructed lanes that extend substantially lengthwise through the poultry house. In step two, at least a portion of the conveyor is positioned substantially parallel to the longitudinal centerline axis of the poultry house.

In step 3, while traversing the width of the poultry house along a circuitous path along each unobstructed lane of the poultry house, the farmer collects, by throwing, for example, the carcasses of dead poultry found in each unobstructed lane of the poultry house onto the floor of the poultry house at the conveyor. In step 4, the carcasses on the floor of the poultry house are placed onto the conveyor. In step 5, the carcasses are conveyed for removal out of the poultry house using the conveyor. The method can further include the step of collecting all the carcasses conveyed out of the poultry house in a container for disposal.

In addition, the step of collecting the carcasses on the conveyor includes placing all the carcasses collected on the floor onto the conveyor during a single traverse of the length of the poultry. Moreover, the step of positioning the conveyor further includes step of positioning the conveyor along the longitudinal centerline axis of the poultry house.

The positioning step also includes the step of suspending the conveyor off of the floor of the poultry house. Also, the step of suspending the conveyor comprises, according to a further embodiment of the invention, suspended the conveyor by wires that extend and retract to move the conveyor between a stored position adjacent a ceiling of the poultry house and an operational position adjacent to the floor of the poultry house which permits easy loading of poultry from the poultry house floor onto the conveyor belt.

The step of positioning the conveyor can further comprises the step of adjusting the height of the conveyor above the floor of the poultry house to a height for easy loading of carcasses onto the conveyor as well as moving the conveyor from a stored position adjacent a ceiling of the poultry house to an operational position adjacent to the floor of the poultry house which permits easy loading of carcasses from the poultry house floor onto the conveyor. Moreover, the step of positioning the conveyor can further include the step of storing the conveyor by moving the conveyor from the operational position to the stored position adjacent the ceiling after all the carcasses are conveyed out of the poultry house.

In accordance with yet another embodiment of the method, the step of suspending the conveyor comprises suspending a basket from an overhead rail by wheels, at least a portion of the overhead rail extending substantially parallel to the longitudinal axis of the poultry house. In this embodiment of the invention, the step of positioning the conveyor can comprising the step of positioning the conveyor along the longitudinal centerline axis of the poultry house or adjacent the interior perimeter of the poultry house. In this embodiment, the step of collecting the carcasses on the conveyor comprises placing the carcasses in the basket suspended from the overhead rail while manually rolling the basket along the rail substantially from one end of the poultry house to the other. As previously noted, the basket is substantially open on all side so that the step of collecting the carcasses further comprising placing the carcasses of dead poultry into the basket from any side of the basket.

Alternatively the step of suspending the conveyor comprises suspending the basket from an overhead rail by a motor driven wheel, at least a portion of the overhead rail extending parallel to the longitudinal axis of the poultry house. In this arrangement, the step of collecting the carcasses on the conveyor comprises placing the carcasses in the basket suspended from the overhead rail while the basket is moved along the rail under the control of the motor driven wheel. In this arrangement, the method further includes controlling the operation of the motor driven wheel with a remote control, hand-held device so that the position of the basket along the overhead rail is controlled by the remote control device.

In the embodiments of the method employing the overhead rail, the step of positioning the conveyor comprises further comprises positioning the overhead rail so as to extend substantially along the longitudinal centerline axis of the poultry house or in the alternative, adjacent to an interior perimeter of the poultry house. In the latter embodiment, the step of positioning the overhead rail adjacent to the interior perimeter of the house can be in the form of a closed loop as best seen in FIG. 4.

Although the present invention has been described with particular reference to its preferred embodiments, it should be understood that many variations and modifications will now be obvious to those skilled in the art and it is preferred, therefore, that the scope of the invention be limited, not by the specific disclosure herein, but rather only by the appended claims.

What is claimed is:

1. A method of removing carcass of dead poultry randomly scattered throughout a poultry house having a floor, a width, a length and a longitudinal centerline axis, the method comprising the steps of:
   arranging items in the poultry house to form unobstructed lanes that extend substantially lengthwise through the poultry house;
   positioning at least a portion of a conveyor substantially parallel to the longitudinal centerline axis of the poultry house, the conveyor having a movable surface on which the carcasses are placed;
   while traversing the width of the poultry house along each unobstructed lane of the poultry house, depositing the carcasses of dead poultry found in each unobstructed lane of the poultry house onto the floor of the poultry house at the conveyor;
   placing all the carcasses collected on the floor of the poultry house onto the surface of the conveyor; and
   conveying the collected carcasses for removal out of the poultry house using the conveyor.

2. A method according to claim 1, further comprising the step of collecting all the carcasses conveyed out of the poultry house in a container for disposal.

3. A method according to claim 1, wherein the step of collecting the carcasses on the conveyor comprises placing all the carcasses collected on the floor onto the conveyor during a single traverse of the length of the poultry.

4. A method according to claim 1, the step of positioning the conveyor further comprises the step of suspending the conveyor off of the floor of the poultry house.

5. A method according to claim 1, wherein the step of positioning the conveyor comprises positioning the enter length of the conveyor substantially parallel to the longitudinal axis of the poultry house.

6. A method according to claim 1, wherein the step of positioning the conveyor comprises positioning the conveyor adjacent to and substantially parallel with an interior perimeter of the poultry-house.

* * * * *